Patented June 8, 1954

2,680,693

UNITED STATES PATENT OFFICE 2,680,693

MANUFACTURE OF CELLULOSE ESTERS

Walter Henry Groombridge, Harold Bates, and James Wotherspoon Fisher, Spondon, near Derby, England, assignors to British Celanese Limited, a corporation of Great Britain No Drawing. Application July 15, 1950, Serial No. 174,131

Claims priority, application Great Britain August 31, 1949

10 Claims. (Cl. 106—189)

This invention relates to the manufacture of cellulose esters.

It is known that cellulose acetate, for example, may be made not only by processes in which the ester goes into solution (usually in acetic acid or methylene chloride) as it is formed, but also by processes (which may be termed suspension processes) in which the ester retains the fibrous form of the cellulose from which it has been made. One such process is described in U. S. application Serial No. 174,132, filed July 15, 1950, now Patent No. 2,607,771. Heretofore suspension processes have only been employed commercially to produce a fully acetylated cellulose, i. e. cellulose triacetate, and it is an object of the present invention to provide a ripening process whereby acetone-soluble and other partly de-acetylated products can be obtained from cellulose triacetate made by suspension processes, and especially by the new process described in U. S. application serial No. 174,132, now Patent No. 2,607,771. The invention is not however limited in this respect, and the invention can be applied generally to the ripening of cellulose triacetate and other cellulose esters.

According to the invention, the cellulose triester is ripened in solution in a substantially anhydrous solvent mixture of which one component is an alcohol and which is substantially free from organic carboxylic acids. In particular cellulose acetate may be ripened in a substantially anhydrous mixture of a chlorinated aliphatic hydrocarbon and a lower aliphatic alcohol, preferably methanol or ethanol. In its preferred form, the invention consists in ripening cellulose acetate in solution in a substantially anhydrous mixture of methylene chloride and methanol, preferably containing about 8–15% and especially about 10% (by volume) of methanol.

The amount of the solvent mixture employed should be at least enough to provide all the alcohol required for the ripening reaction without so changing the solvent properties of the mixture as to cause the cellulose ester to precipitate. For example when cellulose triacetate is ripened in solution in a mixture of methylene chloride and methanol containing 8–15% of methanol, the amount of the solvent mixture may be above 5 times the dry weight of the cellulose acetate. For reasons of economy it is usually desirable not to use too great a quantity of the solvent mixture and we have found that an amount between 5 and 8 times the weight of the cellulose acetate is very satisfactory.

When the ripening is carried out at ordinary or fairly high temperatures, e. g. temperatures below about 120° C., the solution should contain a catalyst for the alcoholysis reaction involved, preferably a mineral acid. Examples of mineral acids that may be used as catalysts are hydrogen chloride, sulphuric acid and perchloric acid. Of these hydrogen chloride is the most efficient and its use is preferred; perchloric acid on the other hand is less efficient than sulphuric acid. The catalyst should be present in amount below 15% and preferably below 5% of the dry weight of the cellulose triester; thus hydrogen chloride may be used in amount 0.25%–5%, and sulphuric acid in amount 0.5%–5%, of the weight of the cellulose ester.

The ripening may be carried out by standing, or by stirirng or by otherwise agitating, the solution at room temperature or at a higher temperature, e. g. a temperature between about 20° and 150° C., temperatures above 50° C. and especially between about 55° and 75° C. being very suitable. When the solvent comprises methylene chloride, it is advisable even when working at room temperature to carry out the process in closed vessels, while at temperatures substantially above 50° C. it is of course necessary to employ pressure vessels. On the other hand, when higher boiling solvents are used, for example ethylene dichloride in admixture with methanol (or ethanol), cellulose triacetate may be ripened under conditions such that the methyl acetate (or ethyl acetate) is removed by distillation as it is formed. The ripening is allowed to continue until a cellulose ester having the desired acyl value and solubility properties is obtained.

When this point has been reached the ripening process may be halted by neutralising the catalyst, e. g. with a carbonate or acetate of an alkali or alkaline earth metal or of magnesium; or, when the ripening has been effected at a high temperature in the absence of a catalyst, the ripening may be halted by reducing the temperature.

The ripened cellulose ester may be isolated, or obtained in solution in a desired solvent, in any suitable way. For example when cellulose triacetate has been ripened in solution in a mixture of methylene chloride and methanol, and it is desired to isolate the cellulose acetate in the form of a solid, the methylene chloride, the methanol, and the methyl acetate formed in the ripening may be removed by distillation, or the cellulose acetate may be precipitated from the solution by mixing in a sufficient quantity of a non-solvent therefor, e. g. water or an alcohol.

Advantageously hot or boiling water may be mixed into the solution so as to precipitate the cellulose acetate and at the same time evaporate off most or all of the organic liquids. Cellulose acetate so obtained may be given any desired further treatment to purify it, or it may be dissolved in acetone directly to form a spinning or film-forming solution in known ways.

It is also possible to obtain a solution of the cellulose acetate in acetone without the intermediate isolation of solid cellulose acetate. One method of doing this, which is believed to be novel and which may be applied to the production of acetone solutions of cellulose acetate from solutions, however obtained, in mixtures of methylene chloride with a smaller proportion of methanol, and with or without methyl acetate, consists in adding to the solution acetone in amount substantially exceeding the amount required in the final solution, and removing the methylene chloride, methanol and any methyl acetate by distillation. The acetone may be all added before the distillation begins, or part may be added before and part during the distillation, or all during, or indeed part after the distillation, so long as throughout the process sufficient solvent of one kind or another is present to keep substantially the whole of the cellulose acetate in solution. (If a small amount of precipitate should be formed during the distillation, it can subsequently be removed by filtering the solution.) We have found that although the boiling points of methyl acetate and acetone are almost identical, while that of methanol is higher than that of acetone, it is quite practicable to obtain a solution of the cellulose acetate in substantially pure acetone (or in acetone containing a little water, say 5–8%) without having to distil over and subsequently recover an unreasonable amount of acetone. Solutions of cellulose acetate in acetone suitable for spinning into filaments or casting or extruding into films may be obtained in this way without at any time after the ripening operation precipitating and drying the cellulose acetate.

While the invention has been described with particular reference to the use in ripening cellulose triacetate of the preferred solvent mixtures of methylene chloride and methanol, it is not limited thereto. Thus the methanol may be replaced by another alcohol, especially a lower aliphatic alcohol such for example as ethanol or isopropanol, and the methylene chloride may be replaced by another chlorinated hydrocarbon which dissolves cellulose triacetate, e. g. tetrachlorethane or chloroform. It is of course necessary to employ a mixture which will retain sufficient solvent power for the cellulose acetate during the ripening to prevent the cellulose acetate precipitating before the desired acetyl value has been attained.

Esters of other lower carboxylic acids, e. g. cellulose tripropionate and tributyrate, may be ripened under substantially the same conditions as cellulose triacetate. In addition, since they are in general soluble in acetone, they may if desired be dissolved for ripening in a mixture of acetone and a small proportion, e. g. up to 10% or 15%, of methanol or ethanol or other lower aliphatic alcohol, without using a halogenated hydrocarbon. If it is then desired to obtain from the ripened cellulose ester a solution in substantially pure acetone, the ripened ester may be precipitated by known methods, washed, and then redissolved in acetone. For some purposes however the acetone solution in which the ripening has been effected (containing the alkyl acetate formed in the ripening and any alcohol remaining unreacted) may be employed directly.

The invention is illustrated by the following examples.

Example 1

A fibrous cellulose triacetate obtained by an acetylation process of the suspension type was dissolved in 6.5 times its weight of a 90:10 (by volume) mixture of methylene chloride and methanol containing 0.5% (on the weight of the cellulose triacetate) of anhydrous hydrogen chloride. The solution was rapidly heated to 65° C. and allowed to stand at this temperature for two hours. An aqueous solution of sodium acetate was then added in amount slightly exceeding that required to neutralise the hydrogen chloride and boiling water was then rapidly added to precipitate the cellulose acetate and at the same time distil off the organic liquids. The product had an acetyl value of 56.5% (reckoned as acetic acid) and dissolved in acetone to give a solution of good clarity.

When the ripening time was extended to 3 hours a product of acetyl value 53.4% was obtained.

Example 2

The process of Example 1 was repeated, substituting 0.5% of sulphuric acid for the hydrogen chloride. After 4 hours ripening, the product had an acetyl value of 56.1% and dissolved in acetone to give a solution of good clarity.

Example 3

The process of Example 1 or 2 was repeated, except that the ripened cellulose acetate was not precipitated. Instead, after the catalyst had been neutralised, the solution was diluted with an equal volume of acetone and distilled under atmospheric pressure until the volume of distillate was about 10% more than the volume of the solution before the acetone was added. There remained a clear solution of the cellulose acetate in acetone, free from significant quantities of methylene chloride, methanol and methyl acetate.

In the present specification the term "cellulose triester" is employed, as is the common practice in the industry, to denote not only esters having the absolute maximum acyl value, but also esters having somewhat lower acyl values but closely resembling the "absolute" triesters in solubility properties. For example, strictly speaking cellulose triacetate has an acetyl value of 62.5%, but the name "cellulose triacetate" is applied to cellulose acetate of acetyl value above about 60%.

Having described our invention, what we desire to secure by Letters Patent is:

1. Process for the manufacture of lower aliphatic esters of cellulose having less than the theoretical acyl value for the triester, which comprises dissolving a fibrous cellulose triester of the lower aliphatic acid in a substantially anhydrous solvent mixture of methylene chloride and methanol containing 8 to 15% by volume of methanol, and ripening the cellulose acetate in the solution so obtained.

2. Process for the manufacture of cellulose acetate having less than the theoretical acyl value for the triacetate, which comprises dissolving a fibrous cellulose triacetate in a substantially anhydrous solvent mixture of methylene chloride and methanol containing 8 to 15% by volume of methanol, and ripening the cellulose acetate in the solution so obtained.

3. Process for the manufacture of lower aliphatic esters of cellulose having less than the theoretical acyl value for the triester, which comprises dissolving a fibrous cellulose triester of the lower aliphatic acid in a substantially anhydrous solvent mixture comprising a chlorinated lower aliphatic hydrocarbon and a lower aliphatic alcohol and substantially free from carboxylic acids, and ripening the cellulose ester in the solution so obtained at a temperature below 120° C. in the presence of less than 15%, based on the weight of the cellulose triester, of a mineral acid catalyst for the alcoholysis involved.

4. Process for the manufacture of cellulose acetate having less than the theoretical acyl value for the triacetate, which comprises dissolving a fibrous cellulose triacetate in a substantially anhydrous solvent mixture comprising a chlorinated lower aliphatic hydrocarbon and a lower aliphatic alcohol and substantially free from carboxylic acids, and ripening the cellulose acetate in the solution so obtained at a temperature below 120° C. in the presence of less than 15%, based on the weight of the cellulose triacetate, of a mineral acid catalyst for the alcoholysis involved.

5. Process for the manufacture of cellulose acetate having less than the theoretical acyl value for the triacetate, which comprises dissolving a fibrous cellulose triacetate in a substantially anhydrous solvent mixture of methylene chloride and methanol containing 8 to 15% by volume of methanol, and ripening the cellulose acetate in the solution so obtained at a temperature below 120° C. using as catalyst hydrogen chloride in amount 0.25%–5% of the weight of the cellulose triacetate.

6. Process for the manufacture of cellulose acetate having less than the theoretical acyl value for the triacetate, which comprises dissolving a fibrous cellulose triacetate in a substantially anhydrous solvent mixture of methylene chloride and methanol containing 8 to 15% by volume of methanol, and ripening the cellulose acetate in the solution so obtained at a temperature below 120° C. using as catalyst sulphuric acid in amount 0.5%–5% of the weight of the cellulose triacetate.

7. Process for the manufacture of an acetone-soluble cellulose acetate in acetone solution, which comprises dissolving a fibrous cellulose triacetate in a substantially anhydrous mixture of methylene chloride and methanol containing 8–15% by volume of methanol, ripening the cellulose triacetate in the solution at a temperature between 20° and 150° C. until an acetone-soluble cellulose acetate has been formed, adding acetone to the solution and distilling off methylene chloride, methanol and methyl acetate formed in the course of the ripening, the amount of acetone present at all times during the distillation being at least enough to keep the cellulose acetate in solution.

8. Process for the manufacture of an acetone-soluble cellulose acetate in acetone solution, which comprises dissolving a fibrous cellulose triacetate in a substantially anhydrous mixture of methylene chloride and methanol containing 8–15% by volume of methanol, ripening the cellulose triacetate in the solution at a temperature between 20° and 120° C., in the presence of less than 15%, based on the weight of the cellulose triacetate, of a mineral acid catalyst for the alcoholysis involved, until an acetone-soluble cellulose acetate has been formed, neutralizing the catalyst, adding acetone to the solution and distilling off methylene chloride, methanol and methyl acetate formed in the course of the ripening, the amount of acetone present at all times during the distillation being at least enough to keep the cellulose acetate in solution.

9. Process for the manufacture of an acetone-soluble cellulose acetate in acetone solution, which comprises dissolving a fibrous cellulose triacetate in a substantially anhydrous mixture of methylene chloride and methanol containing 8–15% by volume of methanol, ripening the cellulose triacetate in the solution at a temperature between 20° and 120° C. using as catalyst hydrogen chloride in amount 0.25–5% of the weight of the cellulose triacetate until an acetone-soluble cellulose acetate has been formed, neutralizing the catalyst, adding acetone to the solution and distilling off methylene chloride, methanol and methyl acetate formed in the course of the ripening, the amount of acetone present at all times during the distillation being at least enough to keep the cellulose acetate in solution.

10. Process for the manufacture of an acetone-soluble cellulose acetate in acetone solution, which comprises dissolving a fibrous cellulose triacetate in a substantially anhydrous mixture of methylene chloride and methanol containing 8–15% by volume of methanol, ripening the cellulose triacetate in the solution at a temperature between 20° and 120° C. using as catalyst sulphuric acid in amount 0.5–5% of the weight of the cellulose triacetate until an acetone-soluble cellulose acetate has been formed, neutralizing the catalyst, adding acetone to the solution and distilling off methylene chloride, methanol and methyl acetate formed in the course of the ripening, the amount of acetone present at all times during the distillation being at least enough to keep the cellulose acetate in solution.

References Cited in the file of this patent

UNITED STATES PATENTS

| Number | Name | Date |
|---|---|---|
| 1,984,147 | Malm | Dec. 11, 1934 |
| 1,990,625 | Walter | Feb. 12, 1935 |
| 2,015,067 | Dreyfus | Sept. 24, 1935 |
| 2,121,899 | Auden | June 28, 1938 |
| 2,140,543 | Northrop et al. | Dec. 20, 1938 |
| 2,143,332 | Sindl et al. | Jan. 10, 1939 |
| 2,301,904 | Lamborn | Nov. 10, 1942 |
| 2,352,022 | Schuller | June 20, 1944 |

FOREIGN PATENTS

| Number | Country | Date |
|---|---|---|
| 337,366 | Great Britain | Oct. 27, 1930 |